(12) United States Patent
Kurobe et al.

(10) Patent No.: US 6,643,078 B2
(45) Date of Patent: Nov. 4, 2003

(54) ALUMINUM REFLECTING MIRROR AND METHOD OF MAKING THE SAME

(75) Inventors: Kunio Kurobe, Saitama (JP); Susumu Aihara, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/385,625

(22) Filed: Mar. 12, 2003

(65) Prior Publication Data

US 2003/0152782 A1 Aug. 14, 2003

Related U.S. Application Data

(62) Division of application No. 09/858,460, filed on May 17, 2001, now Pat. No. 6,558,741.

(30) Foreign Application Priority Data

Jun. 5, 2000 (JP) .................................. 2000-167485

(51) Int. Cl.$^7$ .......................... G02B 5/08; B32B 17/06; B05D 5/06
(52) U.S. Cl. ................... 359/884; 359/838; 359/883; 359/900; 428/428; 428/432; 427/165; 427/166; 427/167; 427/255.7; 427/419.3
(58) Field of Search ........................ 427/593, 164, 427/165, 166, 167, 255.7, 419.3, 419.4; 359/838, 883, 884, 900; 428/428, 432

(56) References Cited

U.S. PATENT DOCUMENTS

| 4,482,209 A | * 11/1984 | Grewal et al. ............... 359/883 |
| 4,919,778 A | 4/1990 | Dietrich et al. |
| 5,073,451 A | 12/1991 | Iida et al. |
| 5,085,904 A | * 2/1992 | Deak et al. ................. 428/35.7 |
| 5,201,926 A | 4/1993 | Szczyrbowski et al. |
| 6,262,847 B1 | * 7/2001 | Tsukamoto .................. 359/584 |

FOREIGN PATENT DOCUMENTS

| DD | 299 774 | 5/1992 |
| JP | 5-150105 | 6/1993 |
| JP | 05-150105 A | * 6/1993 |

OTHER PUBLICATIONS

Japanese Patent Office, English Language Translation of Abstract from Patent Abstracts of Japan, with Japanese Unexamined Patent Publication No.: 5–150105, Publication Date: Jun. 18, 1993, Application No.: 3–317870, Application Filing Date: Dec. 2, 1991, pp. 1–3.

* cited by examiner

*Primary Examiner*—Shrive P. Beck
*Assistant Examiner*—Wesley D. Markham
(74) *Attorney, Agent, or Firm*—Snider & Associates; Ronald R. Snider

(57) ABSTRACT

Within a chamber in a vacuum atmosphere, SiO is deposited on a glass substrate so as to form a first layer as a protective film, Al is deposited on the first layer so as to form a second layer as an aluminum reflective film, $MgF_2$ is deposited on the second layer so as to form a third layer as a transparent protective film, and $CeO_2$ is deposited on the third layer so as to form a fourth layer as a transparent protective film. Then, while $O_2$ gas is introduced into the chamber, $SiO_2$ is deposited on the fourth layer so as to form a fifth layer as a transparent protective film.

2 Claims, 4 Drawing Sheets

ALUMINUM REFLECTING MIRROR AND METHOD OF MAKING THE SAME

RELATED APPLICATIONS

This application claims the priority of Japanese Patent Application No. 2000-167485 filed on Jun. 5, 2000, which is incorporated herein by reference. This application is a divisional of application Ser. No. 09/858,460, filed on May 17, 2001 (now U.S. Pat. No. 6,558,741 issued May 6, 2003).

BACKGROUND OF THE INVENTION

1. Field of the Invention

The present invention relates to a method of making an aluminum reflecting mirror in which a protective film, an aluminum reflective film, and a transparent protective film comprising a plurality of layers are laminated on a glass substrate; and to the aluminum reflecting mirror made in accordance with the method to which the invention relates.

2. Description of the Prior Art

Various kinds of aluminum reflecting mirrors for use in optical apparatus have conventionally been developed.

For example, Japanese Unexamined Patent Publication No. 5-150105 discloses an aluminum reflecting mirror in which a surface of a substrate made of glass, plastics, or ceramics is smoothed, a protective film made of $SiO_2$ is formed on the surface of substrate, a reflective film made of Al is formed on the protective film, and a transparent protective film is formed on the reflective film, whereas the transparent protective film comprises an $MgF_2$ film, a $TiO_2$ or $CeO_2$ film, and an $Al_2O_3$ film.

When Al is directly deposited on a glass substrate, the Al reflective film may be corroded by ingredients precipitated from the glass substrate. Therefore, the $SiO_2$ film is formed between the glass substrate and aluminum reflective film in the aluminum reflecting mirror disclosed in the above-mentioned publication, so as to prevent the aluminum reflective film from corroding, for example.

Also, the transparent protective film in which an $MgF_2$ film, a $TiO_2$ or $CeO_2$ film, and an $Al_2O_3$ film are laminated on the aluminum reflective film is formed in order to protect the aluminum reflecting film and improve its environmental resistance.

While $Al_2O_3$ is deposited as the outermost transparent protective film in the above-mentioned conventional aluminum reflecting mirror, $Al_2O_3$ cannot be deposited by resistance-heating deposition method but by electron bombardment method using an expensive electron gun, which increases the cost of equipment.

Also, while the deposition of each layer and the like must be carried out in a vacuum atmosphere when making an aluminum reflecting mirror, it takes a certain extent of time for attaining the vacuum atmosphere within a chamber. Therefore, for improving the manufacturing efficiency, it is necessary that all the materials for forming the substrate, protective film, aluminum reflective film, and transparent protective film be accommodated within the chamber and then the chamber be evacuated, so as to continuously carry out the deposition of individual layers and the like.

Since different materials are used for the protective film, aluminum reflective film, and individual layers of the transparent protective film, however, a space for accommodating all these materials is necessary in the above-mentioned conventional aluminum reflecting mirror. Further, instruments used for resistance-heating deposition method and an electron gun must be provided, which increases the size of chamber.

SUMMARY OF THE INVENTION

In view of the circumstances mentioned above, it is an object of the present invention to provide a method of making an aluminum reflecting mirror by which all the layers can be formed by resistance-heating deposition method whereas the size of manufacturing equipment can be reduced, and an aluminum reflecting mirror.

In order to achieve the above-mentioned object, the present invention provides a method of making an aluminum reflecting mirror in which first to fifth layers are laminated on a glass substrate successively from the glass substrate side, the method comprising:

a step of evacuating a chamber accommodating therein the glass substrate and respective materials for forming the first to fifth layers;

a step of forming the first layer as a protective film by depositing SiO on the glass substrate;

a step of forming the second layer as an aluminum reflective layer by depositing Al on the first layer;

a step of forming the third layer as a transparent protective layer by depositing $MgF_2$ on the second layer;

a step of forming the fourth layer as a transparent protective layer by depositing $CeO_2$ on the third layer; and a step of forming the fifth layer as a transparent protective layer by depositing $SiO_2$ on the fourth layer while introducing $O_2$ gas into the chamber.

The step of forming the third layer may comprise:

a first step of depositing $MgF_2$ at a deposition temperature lower than 80° C.; and a second step of depositing $MgF_2$ at a deposition temperature higher than 300° C.

Each of the first to fifth layers may be formed by resistance-heating method.

The step of forming of the third layer may be carried out such that a lower layer thereof is formed by lower-temperature deposition, and then an upper layer thereof is formed by higher-temperature deposition.

The present invention provides an aluminum reflecting mirror in which first to fifth layers are laminated on a glass substrate successively from the glass substrate side;

wherein the first layer is a protective film formed by depositing SiO, the second layer is an aluminum reflective film formed by depositing Al, the third layer is a transparent protective film formed by depositing $MgF_2$, the fourth layer is a transparent protective film formed by depositing $CeO_2$, and the fifth layer is a transparent protective film formed by depositing $SiO_2$.

The third layer may comprise a two-layer structure composed by a lower layer formed by lower-temperature layer and an upper layer formed by a higher-temperature deposition.

DESCRIPTION OF THE PREFERRED EMBODIMENTS

In the following, the aluminum reflecting mirror in accordance with an embodiment of the present invention will be explained with reference to the drawings.

Figure 1:
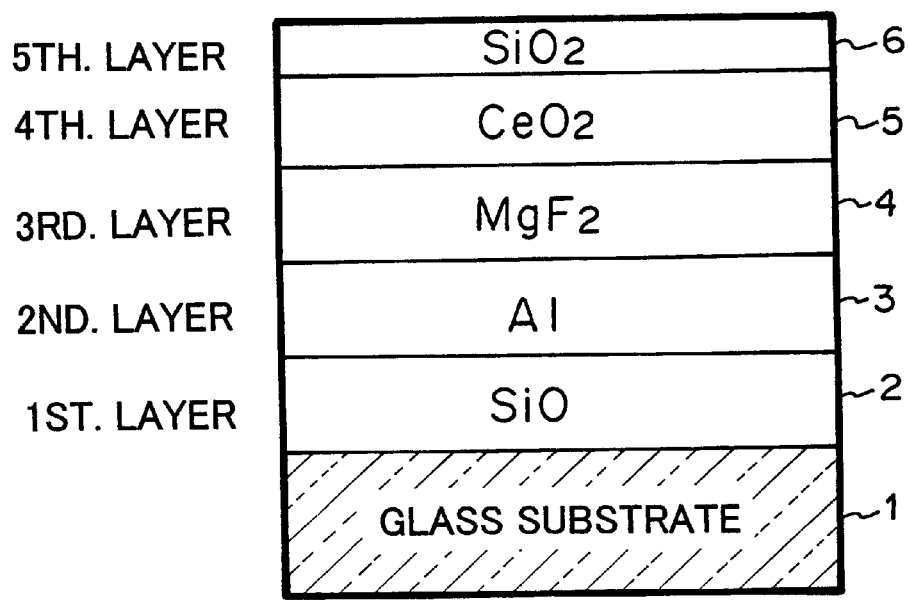
FIG. 1 is a schematic view showing the layer structure of the aluminum reflecting mirror in accordance with an embodiment of the present invention.

FIG. 1 is a schematic view showing the layer structure of the aluminum reflecting mirror in accordance with the embodiment of the present invention.

As shown in FIG. 1, the aluminum reflecting mirror in accordance with the embodiment of the present invention comprises a glass substrate 1; and a first layer as a protective film 2 formed by depositing SiO, a second layer as an aluminum reflective film 3 formed by depositing Al, a third layer as a transparent protective film formed by depositing $MgF_2$, a fourth layer as a transparent protective film 5 formed by depositing $CeO_2$, and a fifth layer as a transparent protective layer 6 formed by depositing $SiO_2$ while introducing $O_2$ gas into a chamber, which are successively laminated on the glass substrate 1 in this order therefrom.

The individual layers have such thickness values that, when the wavelength of light in use $\lambda=633$ nm, the first layer as the protective film 2 has an optical film thickness of $(1/4)\lambda$ to $(1/2)\lambda$, the second layer as the aluminum reflective film 3 has a mechanical film thickness of 100 to 500 nm, the third and fourth layers as the transparent protective films 4, 5 each have an optical film thickness of $(1/4)\lambda$, and the fifth layer as the transparent protective film 6 has an optical film thickness of $(1/8)\lambda$ to $(1/16)\lambda$.

Now, with reference to FIG. 2, a method of making the above-mentioned aluminum reflecting mirror will be explained.

Figure 2:
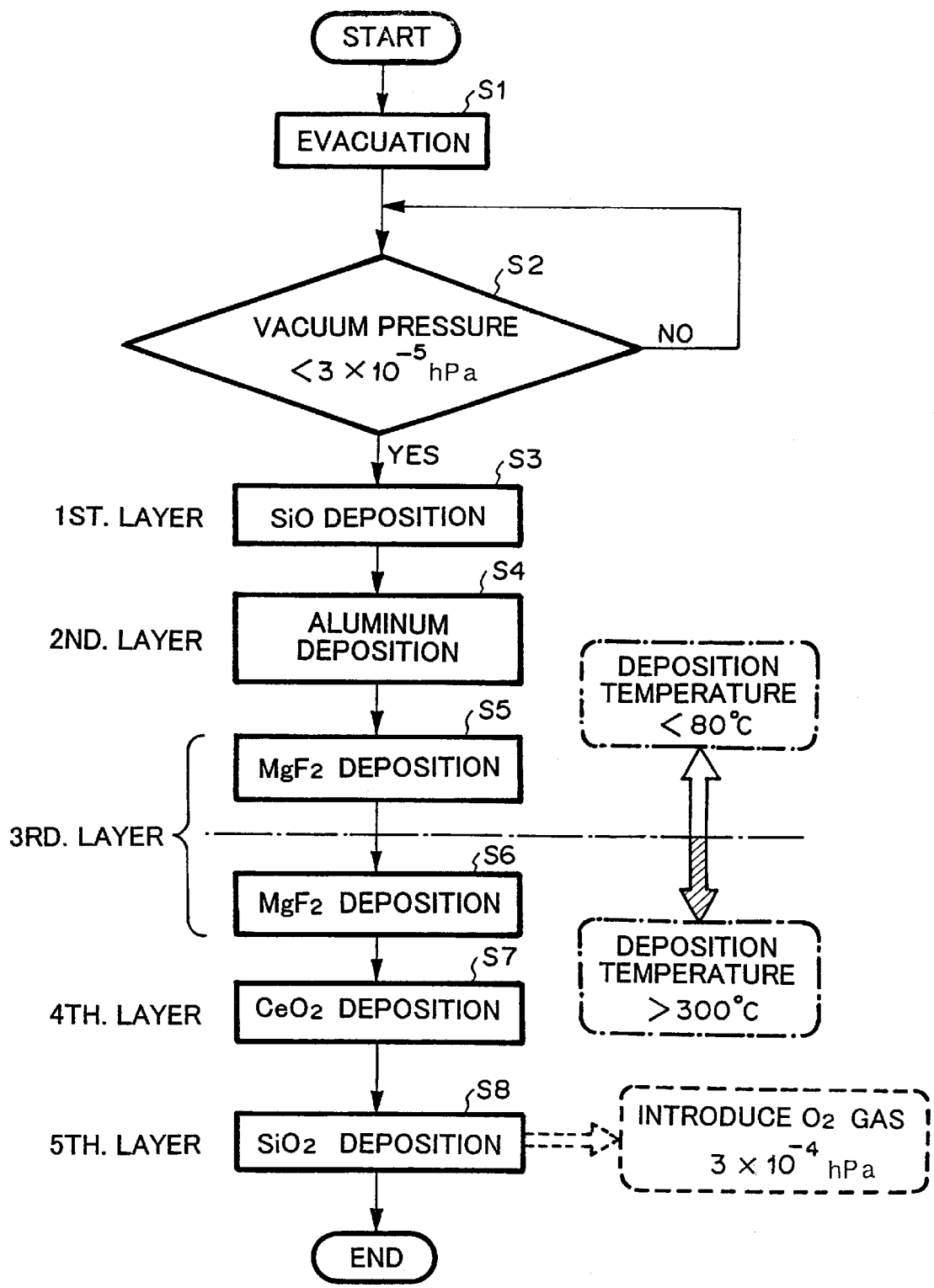
FIG. 2 is a flowchart showing the procedure of making the aluminum reflecting mirror in accordance with the embodiment.

FIG. 2 is a flowchart showing the procedure of making the aluminum reflecting mirror in accordance with this embodiment.

First, when making the aluminum reflecting mirror in accordance with the embodiment of the present invention, the glass substrate 1 is accommodated in a chamber, and materials for the first layer as the protective film 2, the second layer as the aluminum reflective film 3, and the third to fifth layers as the transparent protective layers 4, 5, 6 are also accommodated therein.

Subsequently, as shown in FIG. 2, the chamber is evacuated (S1), such that the pressure therein becomes $3\times10^{-5}$ hPa or less (S2). In this state, the first layer as the protective film 2, the second layer as the aluminum reflective film 3, and the third to fifth layers as the transparent protective films 4, 5, 6 are formed on the glass substrate 1 successively from the glass substrate 1 side by using resistance-heating deposition method.

First, SiO is deposited with an optical film thickness of $(1/4)\lambda$ to $(1/2)\lambda$, so as to form the first layer as the protective film 2 (S3). Subsequently, Al is deposited with a mechanical thickness of 100 to 500 nm on the first layer as the protective film 2, so as to form the second layer as the aluminum reflective film 3 (S4).

Then, $MgF_2$ to become the third layer as the transparent protective film 4 is deposited. Here, $MgF_2$ is initially deposited on the second layer as the aluminum reflective film 2 at a deposition temperature lower than 80° C. (S5), and then at a deposition temperature higher than 300° C. (S6), so that the total optical film thickness becomes $(1/4)\lambda$. These steps (S5, S6) yield substantially the same film thickness.

The transparent protective film of the third layer is thus formed by two-stage deposition in order for the lower-temperature in step 5 (S5) to prevent the second layer as the aluminum reflective film 3 from lowering its reflectivity, and for the higher-temperature deposition in step 6 (S6) to strengthen the film. Further, $CeO_2$ is deposited with an optical film thickness of $(1/4)\lambda$, so as to form the fourth layer as the transparent protective film 5 (S7).

After the fourth layer as the transparent protective film 5 is completely formed, the pressure within the chamber is set to $3\times10^{-4}$ hPa, $O_2$ gas is introduced, and $SiO_2$ is deposited with an optical film thickness of $(1/8)\lambda$ to $(1/16)\lambda$, so as to form the fifth layer as the transparent protective film 6 (S8).

The environmental resistance of the aluminum reflecting mirror in accordance with this embodiment will now be explained.

An environmental resistance test was carried out for the aluminum reflecting mirror in accordance with this embodiment and a conventional aluminum reflecting mirror.

Figure 5:
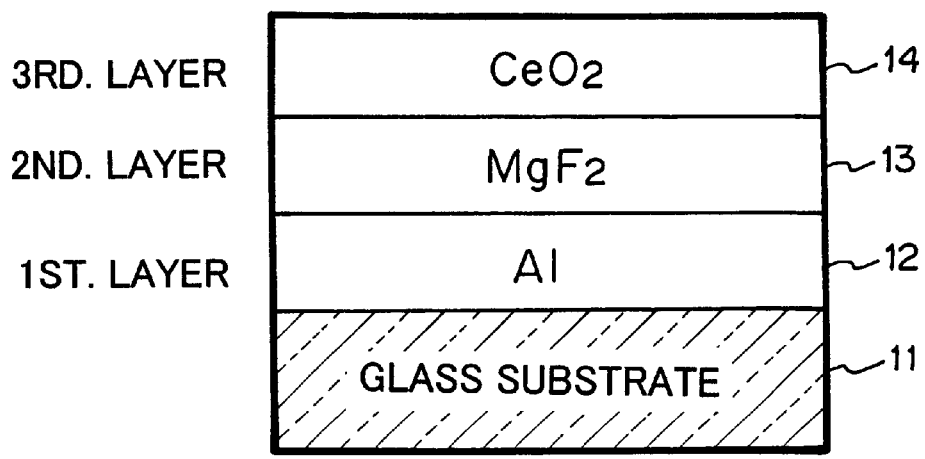
FIG. 5 is a schematic view showing the layer structure of the aluminum reflecting mirror acting as the comparative example for the environmental resistance test.

FIG. 5 is a vertical sectional view of the aluminum reflecting mirror acting as a comparative example for the environmental resistance test.

As shown in FIG. 5, the aluminum reflecting mirror acting as the comparative example comprises a glass substrate 11; and a first layer as an aluminum reflective film 12 formed by depositing Al, a second layer as a transparent protective film 13 formed by depositing $MgF_2$, and a third layer as a transparent protective film 14 formed by depositing $CeO_2$, which are successively laminated on the glass substrate 11 in this order therefrom.

The individual layers have such thickness values that, when the wavelength of light in use $\lambda=633$ nm, the first layer as the aluminum reflective film 12 has a mechanical film thickness of 100 to 500 nm, and the second and third layers as the transparent protective films 13, 14 each have an optical film thickness of $(1/4)\lambda$.

Here, as mentioned above, the film thickness of the aluminum reflecting mirror in accordance with this embodiment used in the environmental resistance test is such that the first layer as the protective film 2 has an optical film thickness of $(1/4)\lambda$ to $(1/2)\lambda$, the second layer as the aluminum reflective film 3 has a mechanical film thickness of 100 to 500 nm, the third and fourth layers as the transparent protective films 4, 5 each have an optical film thickness of $(1/4)\lambda$, and the fifth layer as the transparent protective film 6 has an optical film thickness of $(1/8)\lambda$ to $(1/16)\lambda$.

Test items in the environmental resistance test are "Adhesion" (MIL-C-675C) which is a test for resistance to peel, "Moderate abrasion" (MIL-C-675C) which is a test for resistance to wear, "Humidity" (MIL-C-675C) which is a test for resistance to moisture, and "Salt spray fog" (MIL-C-675C) which is a test for resistance to salt.

The contents of individual test items are as follows:

In the test for resistance to peel, a defined width of cellophane tape was firmly attached to the surface of reflecting mirror, and then rapidly peeled off, whereby the resistance to peel was studied.

In the test for resistance to wear, the surface of reflecting mirror was rubbed 50 strokes with a defined size of cheesecloth with a load of 1 pound applied thereto, whereby the resistance to wear was studied.

In the test for resistance to moisture, the reflecting mirror was left for 24 hours in an environment of 50° C. and 95% Rh, whereby the resistance to humidity was studied.

In the test for resistance to salt, the reflecting mirror was left for 24 hours in an environment in which 5% NaCl was sprayed into an atmosphere of 35° C., whereby the resistance to salt was studied.

The results of tests are shown in the following Table 1.

As can be seen from the above-mentioned Table 1, both the aluminum reflecting mirror in accordance with this embodiment and that of the comparative example exhibited favorable results in the tests for resistance to peel, resistance to wear, and resistance to salt.

In the test for resistance to moisture, however, the mirror surface discolored and deteriorated in the aluminum reflecting mirror of the comparative example. By contrast, the aluminum reflecting mirror in accordance with this embodiment exhibited neither discoloration nor deterioration even after the lapse of 96 hours or more.

As mentioned above, the protective film 2 for blocking precipitates from the glass substrate 1 in order to protect the aluminum reflective film 3 is formed from SiO in the aluminum reflecting mirror in accordance with this embodiment. This SiO film is denser than the $SiO_2$ film, thereby being able to more securely block precipitates from the glass substrate 1 and prevent the metal reflective film from corroding.

Also, the third layer as the transparent protective film 4 is formed from the $MgF_2$ film, whereas the fourth layer as the transparent protective film 5 is formed from the $CeO_2$ film. Since $MgF_2$ and $CeO_2$ have respective stresses acting in opposite directions, the adhesion between these transparent protective films can be enhanced.

Figure 3:
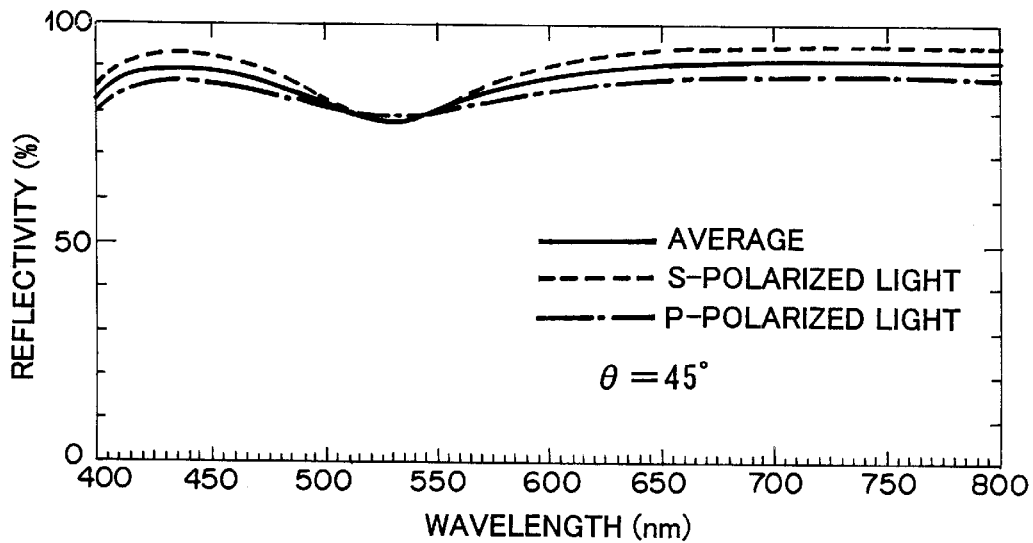
FIG. 3 is a graph showing reflection characteristics in a visible light region of the aluminum reflecting mirror in accordance with the embodiment.
Figure 4:
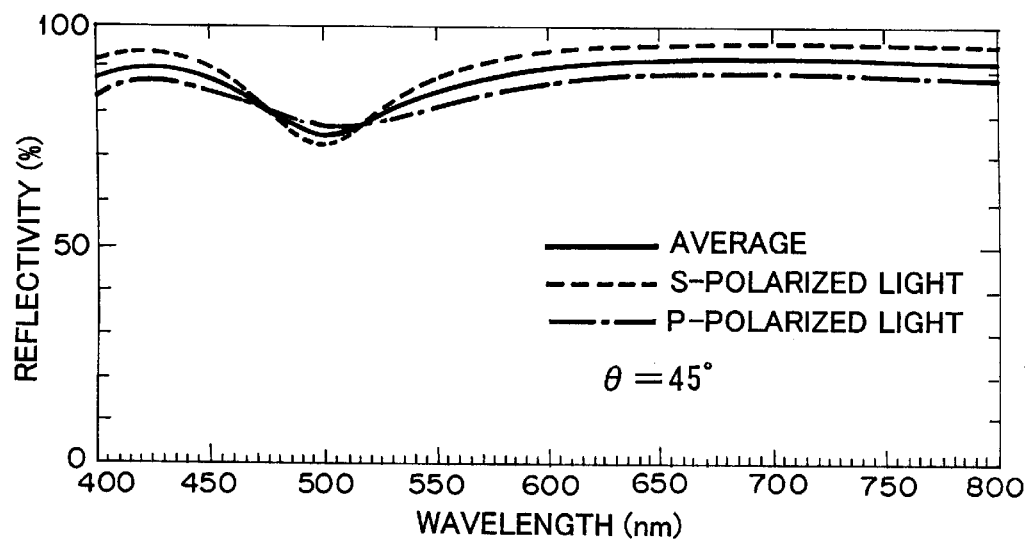
FIG. 4 is a graph showing reflection characteristics in the visible light region of an aluminum reflecting mirror acting as a comparative example for an environmental resistance test.

FIG. 3 shows reflection characteristics (P-polarized light, S-polarized light, and their average value) in a visible light region of the aluminum reflecting mirror in accordance with this embodiment, whereas FIG. 4 shows those of the aluminum reflecting mirror in accordance with the comparative example. In each of FIGS. 3 and 4, the abscissa indicates the wavelength (nm) of incident light, whereas the ordinate indicates the light reflectivity (%).

While the aluminum reflecting mirror in accordance with this embodiment has the transparent protective film 6 made of $SiO_2$ in the outermost fifth layer as compared with the aluminum reflecting mirror in accordance with the comparative example, the reflection characteristics of the former are as favorable as those of the latter as can be seen from FIGS. 3 and 4.

In the aluminum reflecting mirror in accordance with the present invention, the film thickness of each layer can be changed appropriately without being restricted to those mentioned above.

In the method of making an aluminum reflecting mirror and the aluminum reflecting mirror in accordance with the present invention, as explained in the foregoing, an SiO film is formed as the first layer acting as a protective film, an aluminum reflective film is formed as the second layer, an $MgF_2$ film is formed as the third layer acting as a transparent protective film, a $CeO_2$ film is formed as the fourth layer acting as a transparent protective film, and an $SiO_2$ film is formed as the fifth layer acting as a transparent protective film. Consequently, the deposition can be carried out in all the layers by resistance-heating deposition method without using expensive electron guns, whereby the cost of equipment can be reduced.

Also, since the first layer as a protective film and the fifth layer as a transparent protective film are formed from SiO and $SiO_2$, respectively, which comprise Si as a material, the kinds of materials accommodated in the chamber can be reduced, whereby the chamber can be made smaller.

Since the chamber is evacuated in the initial step, whereas $O_2$ is introduced into the chamber in the final step, the individual film-forming steps can be carried out efficiently and continuously, whereby the working efficiency can be enhanced.

TABLE 1

| Test item | Description of test | Comp. Ex. | Embodiment |
| --- | --- | --- | --- |
| Adhesion MIL-C-675C | A defined width of cellophane tape is firmly attached and then peeled rapidly. | good | good |
| Moderate abrasion MIL-C-675C | Rubbed 50 strokes with a load of 1 pound applied thereto. | good | good |
| Humidity MIL-C-675C | Left for 24 hr at 50° C., 95% Rh. | neither good nor bad* | good |
| Salt spray fog MIL-C-675C | Left for 24 hr in spray of 5% NaCl at 35° C. | good | good |

*The mirror surface discolors and deteriorates after 24 hours in the comparative example, whereas no change is seen in the embodiment even after 96 hours.

What is claimed is:

1. An aluminum reflecting mirror in which first to fifth layers are laminated on a glass substrate successively from said glass substrate side;

wherein said first layer is a protective film formed by depositing SiO, said second layer is an aluminum reflective film formed by depositing Al, said third layer is a transparent protective film formed by depositing $MgF_2$ and comprised of a two-layer structure composed by a lower layer formed by lower-temperature deposition and an upper layer formed by a higher-temperature deposition, wherein said lower-temperature deposition is carried out at a temperature sufficient to prevent said aluminum reflective film from lowering its reflectivity and said higher-temperature deposition is carried out at a temperature to strengthen said third layer, said fourth layer is a transparent protective film formed by depositing $CeO_2$, and said fifth layer is a transparent protective film formed by depositing $SiO_2$.

2. An aluminum reflecting mirror according to claim 1, wherein when the wavelength of light in use λ=633 nm, said first layer has an optical film thickness of (¼)λ to (½)λ, said second layer has a mechanical film thickness of 100 to 500 nm, said third layer has an optical film thickness of (¼)λ, said fourth layer has an optical film thickness of (¼)λ, and said fifth layer has an optical film thickness of (⅛)λ to (1/16)λ.

* * * * *

UNITED STATES PATENT AND TRADEMARK OFFICE
CERTIFICATE OF CORRECTION

PATENT NO. : 6,643,078 B2  Page 1 of 1
DATED : November 4, 2003
INVENTOR(S) : Kunio Kurobe and Susumu Aihara It is certified that error appears in the above-identified patent and that said Letters Patent is hereby corrected as shown below:

Column 6,
Line 55, delete "an, optical" and substitute therefore -- an optical --

Signed and Sealed this

Twenty-fourth Day of February, 2004

JON W. DUDAS
*Acting Director of the United States Patent and Trademark Office*